United States Patent
Taniguchi et al.

(10) Patent No.: US 6,836,674 B2
(45) Date of Patent: Dec. 28, 2004

(54) METHOD OF CONTROLLING DIRECTIONAL ANTENNA AND APPARATUS OF THE SAME

(75) Inventors: Tsuyoshi Taniguchi, Yokohama (JP); Tatsuto Okamoto, Yokohama (JP); Satoshi Masuda, Yokohama (JP); Toshiro Suzuki, Tama (JP); Takashi Inoue, Irima (JP); Sumaru Niida, Irima (JP)

(73) Assignees: Hitachi, Ltd., Tokyo (JP); KDDI Corporation, Tokyo (JP)

( * ) Notice: Subject to any disclaimer, the term of this patent is extended or adjusted under 35 U.S.C. 154(b) by 485 days.

(21) Appl. No.: 09/795,491

(22) Filed: Mar. 1, 2001

(65) Prior Publication Data

US 2002/0034967 A1 Mar. 21, 2002

(30) Foreign Application Priority Data

Sep. 19, 2000 (JP) .................................... 2000-283940

(51) Int. Cl.$^7$ .............................................. H04M 1/00
(52) U.S. Cl. .................... 455/562.1; 455/25; 455/450; 455/447; 455/63.3; 455/63.4; 455/575.7; 342/154; 342/367; 342/372; 342/374; 342/373
(58) Field of Search .......................... 455/562.1, 25, 455/447, 450, 63.1, 63.3, 63.4, 575.7; 342/374, 372, 154, 367, 457, 373

(56) References Cited

U.S. PATENT DOCUMENTS

| | | | | |
|---|---|---|---|---|
| 5,666,123 A | * | 9/1997 | Chrystie | .................... 342/373 |
| 5,714,957 A | * | 2/1998 | Searle et al. ................ 342/374 |
| 6,131,031 A | * | 10/2000 | Lober et al. ................ 455/444 |
| 6,188,913 B1 | * | 2/2001 | Fukagawa et al. ........ 455/562.1 |
| 6,289,005 B1 | * | 9/2001 | Katz .......................... 370/328 |
| 6,321,082 B1 | * | 11/2001 | Katz ........................ 455/422.1 |
| 6,366,790 B1 | * | 4/2002 | Kim ..................... 445/562.01 |
| 6,393,303 B1 | * | 5/2002 | Katz ........................ 455/562.1 |
| 6,553,012 B1 | * | 4/2003 | Katz .......................... 370/328 |
| 6,640,110 B1 | * | 10/2003 | Shapira et al. ............. 342/373 |
| 6,643,526 B1 | * | 11/2003 | Katz .......................... 342/359 |
| 6,665,545 B1 | * | 12/2003 | Raleigh et al. .......... 455/562.1 |

FOREIGN PATENT DOCUMENTS

| | | |
|---|---|---|
| JP | 787011 | 3/1995 |
| JP | 89454 | 1/1996 |
| JP | 8289366 | 11/1996 |
| JP | 8340569 | 12/1996 |
| JP | 9238105 | 9/1997 |
| JP | 10126139 | 5/1998 |

* cited by examiner

*Primary Examiner*—Marceau Milord
(74) *Attorney, Agent, or Firm*—Antonelli, Terry, Stout & Kraus, LLP

(57) ABSTRACT

Disclosed is a control apparatus capable of more effectively utilizing radio resources. Mobile stations positioned close to each other are treated as one group, and a direction and width (radiation angle) of a beam radiated from an adaptive array antenna 11 is controlled for each group so that one beam capture one group. To be concrete, a plurality of mobile stations are classified into groups by a classification section 19, and an area to which each group moves is estimated by a directivity determination section 20. The adaptive array antenna 11 is controlled by the directivity control section 15 so that one beam can cover an area in which one group is positioned and the area to which this one group moves.

6 Claims, 10 Drawing Sheets

FIG.5

MOBILE STATION POSITION MANAGEMENT TABLE 191

| MOBILE STATION NUMBER $191_1$ | BLOCK NUMBER $191_2$ | GROUP NUMBER $191_3$ |
|---|---|---|
| 1 | 5011 | 1 |
| 2 | 5012 | 2 |
| ⋮ | ⋮ | ⋮ |
| M | 501L | N |

FIG.6

GROUP NUMBER USAGE STATE MANAGEMENT TABLE 192

| GROUP | USED/UNUSED |
|---|---|
| 1 | USED |
| 2 | USED |
| ⋮ | ⋮ |
| P | UNUSED |

FIG.7

GROUP POSITION RECORD MANAGEMENT TABLE 193

| GROUP NUMBER $193_1$ | CURRENT BLOCK NUMBER $193_2$ | LAST BLOCK NUMBER $193_3$ |
|---|---|---|
| 1 | 5011 | 5211 |
| 2 | 5012 | 5212 |
| ⋮ | ⋮ | ⋮ |
| N | 501L | 521L |

GROUP MOVEMENT STATE MANAGEMENT TABLE 201

| GROUP NUMBER | MOVEMENT SPEED | ACCELERATION | MOVEMENT DIRECTION |
|---|---|---|---|
| 1 | *** | *** | * |
| 2 | *** | *** | * |
| : | : | : | * |
| N | *** | | * |

FIG.11

MOBILE STATION POSITION MANAGEMENT TABLE 191

| MOBILE STATION NUMBER | COORDINATE VALVE | BLOCK NUMBER | GROUP NUMBER |
|---|---|---|---|
| 1 | *** | 5011 | 1 |
| 2 | *** | 5012 | 2 |
| ⋮ | ⋮ | ⋮ | ⋮ |
| M | *** | 501L | N |

FIG.12

GROUP POSITION RECORD MANAGEMENT TABLE 193

| GROUP NUMBER | CURRENT GROUP POSITION | LAST GROUP POSITION | GROUP SCALE |
|---|---|---|---|
| 1 | *** | *** | ** |
| 2 | *** | *** | ** |
| ⋮ | ⋮ | ⋮ | ⋮ |
| N | *** | *** | ** |

METHOD OF CONTROLLING DIRECTIONAL ANTENNA AND APPARATUS OF THE SAME

This application claims a priority based on Japanese Patent Application No. 2000-283940 filed on Sep. 19, 2000, the entire contents of which are incorporated herein by reference for all purposes.

BACKGROUND OF THE INVENTION

The present invention relates to a control of a directional antenna which is set in a base transceiver station to be used for performing radio communications with a plurality of mobile stations, more particularly to a control of an adaptive array antenna capable of changing directions and widths, (radiation angles) of a plurality of beams to radiate them.

In a mobile communication system such as a car telephone and a portable telephone, an omnidirectional antenna has been heretofore set in a base transceiver station, and a beam has been radiated from the omnidirectional antenna, whereby the mobile communication system has covered a service area called a cell which has an approximately circular shape whose center is the base transceiver station. However, an explosive increase in subscribers for several years has caused a serious problem of lack in radio resources.

To cope with this problem, a technology is proposed, in which the cell is divided into a plurality of sectors, and each sector is covered as the service area. This technology is realized by setting a directional antenna (sector antenna) in a base transceiver station. According to this technology each of beams showing a directivity is radiated from the base transceiver station to corresponding one of the sectors so that the sector narrower than the cell is covered as the service area. Therefore, radio resources can be used more effectively. Here, an adaptive array antenna has been known as the directional antenna capable of radiating the beam showing the directivity in plural species. The adaptive array antenna is composed of a plurality of antenna elements, each of which is arranged so as to be spatially apart from others. The plurality of beams can be radiated in any direction and with any width by controlling these antenna elements respectively. Furthermore, a "null "beam showing no directivity can be also radiated.

As a technology for controlling beams radiated by a directional antenna, which is set in a base transceiver station, so that a beam is directed to a mobile station with a high precision, there have been technologies disclosed in Japanese Patent Laid-Open No, 9(1997)-238105 and No. 7(1995)-87011. In the former, a directional antenna is controlled so that a beam is radiated to a direction in which a level of a signal transmitted from a mobile station is high, and thus the beam is directed to the mobile station with a high precision. In the latter, a directional antenna is controlled so that a beam is radiated to a direction in which a level of a signal transmitted from a mobile station is high; a position of each of the mobile stations is estimated based on position information and the like, and a directional antenna is controlled so as to radiate a beam to the estimated position. Thus, the beam is directed to each mobile station with high precision.

SUMMARY OF THE INVENTION

By the way, there are the following problems in the above-described technologies.

Specifically, according to the technology in which the cell is divided into the plurality of sectors, and each sector is covered as the service area, the beam showing the directivity will be radiated from the directional antenna also to the sector in which the mobile station does not exist. Accordingly, radio resources are spent for the directional beam that is not actually used for a communication with the mobile station, so that waste occurs in using the radio resources.

On the other hand, according to the technology in which the directional antenna is controlled so that the beam is radiated to the direction showing the high level of the signal transmitted from the mobile stations, depending on the width of the beam, there is a possibility that the beam does not reach a mobile station which has a low level of signal but is positioned within the service area (cell) covered by the base transceiver station. In this case, this mobile station cannot get a service. Furthermore, according to the technology in which the directional antenna is controlled so that each of the beams is radiated to the corresponding one of the mobile station, processing becomes heavy in accordance with the number of mobile stations positioned in the service area covered by the base transceiver station, and furthermore the control of the beam becomes complicated. In spite that the mobile stations move at an equal linear velocity, an angular velocity of a certain mobile station among the mobile stations which move along the circumference direction around the base transceiver station is higher as this certain mobile station is closer to the base transceiver station than others. Specifically, the mobile station positioned in the vicinity of the base transceiver station generally moves at a higher angular velocity than the mobile station positioned far away from the base transceiver station. Therefore, when a large number of mobile stations exist in the vicinity of the base transceiver station, a faster processing is required to control the directional antenna so that each mobile station can be captured by a specified directional beam among the mobile stations that are moving at fast angular velocities, resulting in an increase in cost of the base transceiver station.

The present invention was made in consideration of such circumstances. An object of the present invention is to utilize radio resources more effectively. To be concrete, an object of the present invention is to control a directional antenna so that each mobile station positioned within a service area covered by a base transceiver station can be captured by one of beams, while achieving effective utilization of radio resources. Furthermore, another object of the present invention is to make it possible to capture a large number of mobile stations by beam without demanding a high processing capability.

To achieve the foregoing objects, in the present invention, a plurality of mobile stations are classified into groups, each of which includes the closely positioned mobile stations, and a directional antenna capable of changing a direction and a width (radiation angle) of a plurality of beams respectively and radiating the plurality of beams is controlled so that an area where one group is positioned can be covered by one beam, that is, so that each beam radiated from the directional antenna can be controlled for each group.

As such directional antenna, an adaptive array antenna is given, which is composed of a plurality of antenna elements disposed so as to be spatially apart from each other.

In the present invention, since no beam is radiated to an area where the mobile station does not exist, radio resources are never consumed for a beam which is not actually used for a communication with the mobile station. Furthermore, since each beam radiated from the directional antenna is controlled in its direction and width so as to be capable of covering an area where a group to be captured is positioned, each mobile station positioned in a service area covered by the base transceiver station can be effectively captured. As described above, according to the present invention, it is possible to control the directional antenna so that each mobile station positioned in the service area covered by the base transceiver station can be captured by the corresponding one of the beams, while utilizing the radio resources effectively. Furthermore, according to the present invention, since each beam radiated from the directional antenna can be controlled for each group into which mobile stations are classified, it is possible to lower a demanded processing capability compared to a case where each beam radiated from the directional antenna is controlled for each mobile station.

In the present invention, an identification number of each group may be set based on a current identification number associated with mobile stations classified into the group concerned, and then the current identification number associated with each mobile station may be updated to the identification number set for the group into which the mobile station concerned is classified. For example, an identification number is set to a group into which more mobile stations associated with the identification number concerned are classified than other groups. Further, with respect to a group to which no identification number is set in the above process, a new identification number is set to the group. Therefore, the identification number is provided with each group. Then, the identification number associated with each mobile station is updated to the identification number set for the group into which the mobile station concerned is classified.

Then, based on a movement record of each group specified by the identification number set in the above-described manner, an area to which each group moves is estimated, and the foregoing directional antenna may be controlled for each group so that one beam can cover an area in which one group is positioned and the area to which this group moves.

With such manner, for example, it is possible to control the directional antenna so that the width of the beam is wide, when the beam is for a group of mobile stations positioned in the vicinity of the base transceiver station having the directional antenna and the mobile stations move at a comparatively high angular velocity with the base transceiver station as the origin, and so that the width of the beam is narrow, when the beam is for a group of mobile stations positioned far away from the base transceiver station and the mobile stations move at a comparatively low angular velocity with the base transceiver station as the origin. Therefore, each mobile station can be effectively captured by the beam, which is positioned in the service area covered by the base transceiver station, while controlling interference of the plurality of beams radiated from the directional antenna.

BRIEF DESCRIPTION OF THE DRAWINGS

FIG. 5 is a view showing an example of a mobile station position management table 191 used in the first embodiment of the present invention.

FIG. 6 is a view showing an example of a group number usage state management table 192 used in the first embodiment of the present invention.

FIG. 7 is a view showing an example of a group position record management table 193 used in the first embodiment of the present invention.

FIG. 11 is a view showing an example of a mobile station position management table 191 used in a second embodiment of the present invention.

FIG. 12 is a view showing an example of a group position record management table 193 used in the second embodiment of the present invention.

DETAILED DESCRIPTION OF THE PREFERRED EMBODIMENTS

Embodiments of the present invention will be described below.

A first embodiment of the present invention will be described first.

Figure 1:
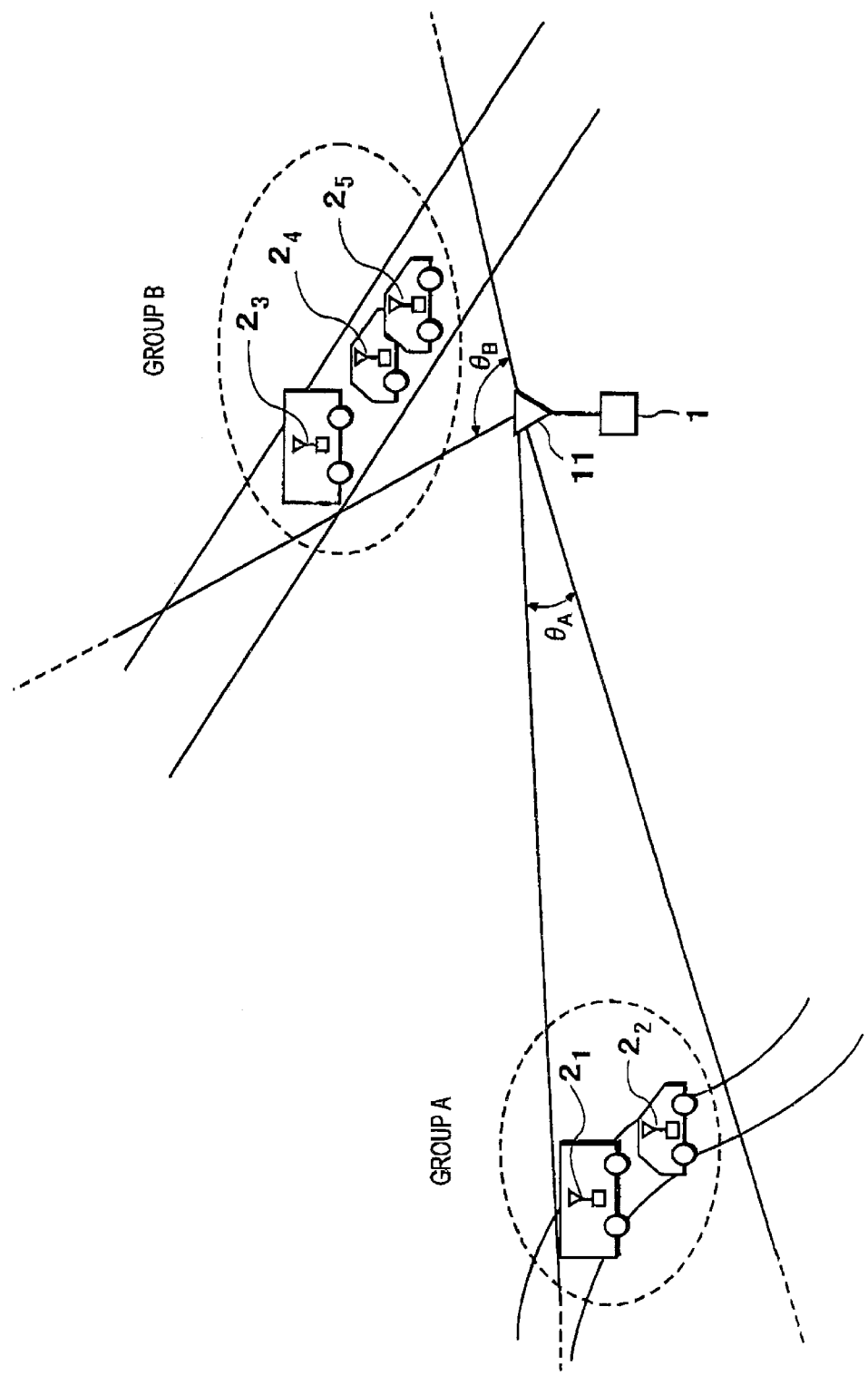
FIG. 1 is a schematic view showing for explaining an outline of a mobile communication system according to a first embodiment of the present invention.

FIG. 1 is a view for explaining an outline of a mobile communication system to which the first embodiment of the present invention is applied.

In FIG. 1, reference numeral 1 denotes a base transceiver station system, and reference numerals $2_1$ to $2_5$ denote mobile stations which are capable of performing a communication with the base transceiver station system 1 using a multiple access manner. In the base transceiver station system 1, an adaptive array antenna 11 is set, which is capable of changing directions and widths (radiation angles) of a plurality of beams to radiate them. These beams are used for sending/receiving traffic channel signals and control channel signals to/from the mobile stations $2_1$ to $2_5$. As a multiple access manner used for the mobile communication system of this embodiment, any style of manners may be adopted as long as they are such that a plurality of mobile stations can be simultaneously connected to the base transceiver station system 1 by use of one beam radiated from the adaptive array antenna 11. Specifically, the present invention can be applied to multiple access manners including any of a code division multiple access (CDMA) manner, a time division multiple access (TDMA) manner, a frequency division multiple access (FDMA) manner and a multiple access manner composed of combinations of them.

As illustrated in FIG. 1, the mobile stations positioned so as to be close to each other are treated as one group in this embodiment. In FIG. 1, the mobile stations $2_1$ and $2_2$ are treated as group A, and the mobile stations $2_3$, $2_4$ and $2_5$ are treated as group B. The direction and width (radiation angle) of a beam radiated from the adaptive array antenna 11 are controlled for each group so that one beam captures one group. To be concrete, an area to which each group moves is estimated, and the adaptive array antenna 11 is controlled for each group so that one beam can cover an area where one group is positioned and an area to which this group moves. For this reason, as shown in FIG. 1, for the group A composed of mobile stations positioned at a remote position from the base transceiver station system 1 and showing comparatively slow angular velocities with the base transceiver station system 1 as an origin, a beam width $\theta_A$ of the beam is narrow. On the other hand, for the group B composed of mobile stations positioned in the vicinity of the base transceiver station system 1 and showing comparatively faster angular velocities, a beam width $\theta_B$ is wide. Therefore, while effectively controlling interference among a plurality of beams radiated from the adaptive array antenna 11, the mobile stations $2_1$ to $2_5$ positioned within a service area covered by the base transceiver station system 1 can be captured by beams.

Note that transmission power of each beam radiated from the adaptive array antenna 11 is set to a sufficient value for capturing an objective group, and is controlled so that unnecessary radio wave does not reach farther than this group. Such control can be realized by existing technologies. For example, such control is realized by controlling the transmission power of the beam directed to the group in accordance with receiving levels of traffic channel signals and control channel signals from the mobile stations belonging to the group.

Next, the base transceiver station system 1 to which this embodiment is applied will be described in detail.

Figure 2:
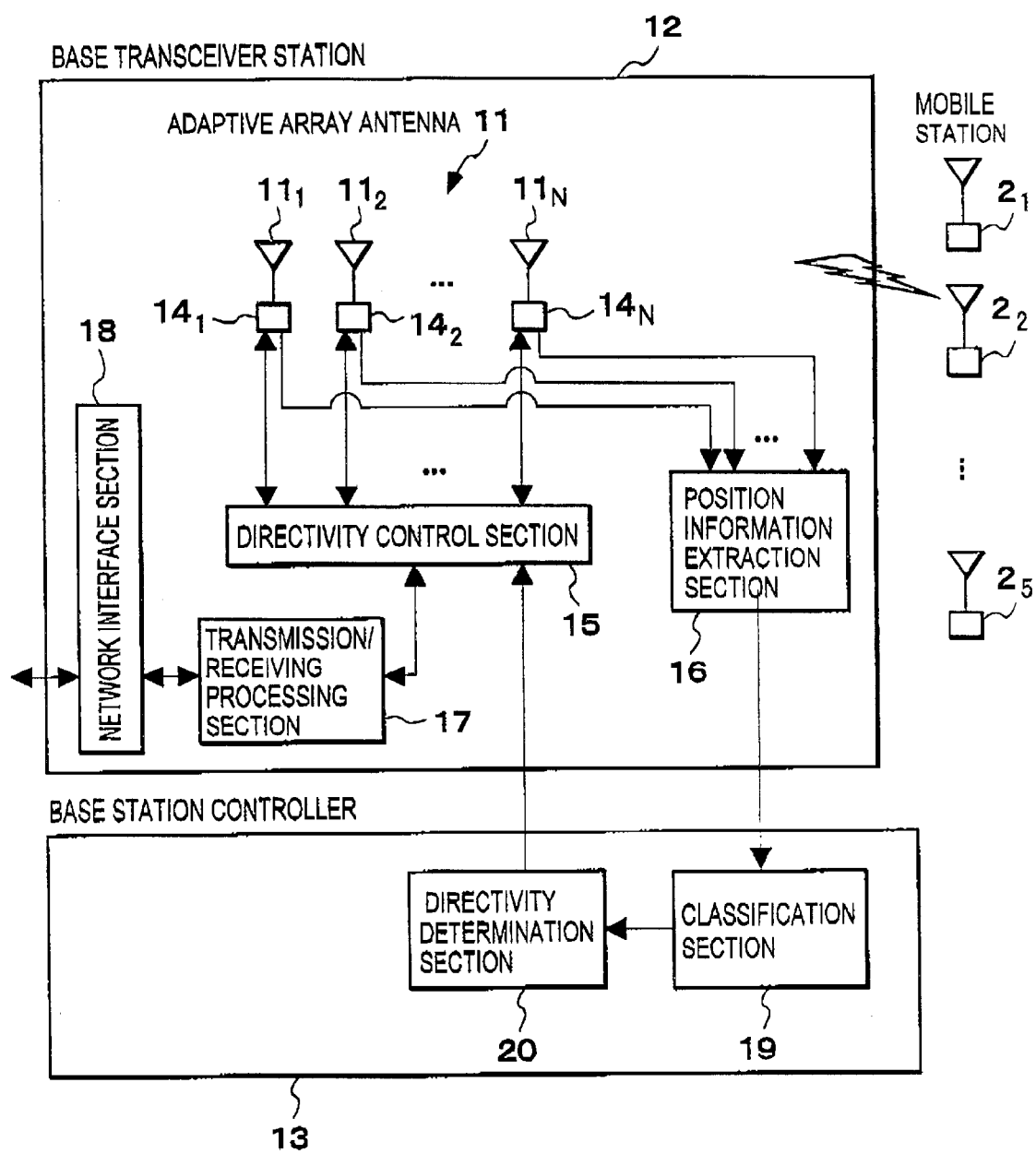
FIG. 2 is a schematic configuration view of a base transceiver station system 1 to which the first embodiment of the present invention is applied.

FIG. 2 is a schematic configuration view of the base transceiver station system 1 used in the first embodiment of the present invention. As shown in FIG. 2, the base transceiver station system 1 comprises a base station apparatus 12 and a base station controller 13.

First, the base station apparatus 12 will be described.

As shown in FIG. 2, the base station apparatus 12 comprises an adaptive array antenna 11 composed of a plurality of antenna elements $11_1$ to $11_N$, which is capable of changing a direction and width (radiation angle) of each of a plurality of beams to be radiated; a plurality of duplexers $14_1$ to $14_N$, each of which is provided for the corresponding one of the antenna elements $11_1$ to $11_N$; a directivity control section 15; a position information extraction section 16; a transmission/receiving processing section 17; and a network interface section 18 connected to, for example, a public network.

Each of the duplexers $14_1$ to $14_N$ divides, depending on, for example, a difference of a frequency band, a signal transmitted and received via the corresponding one of the antenna elements $11_1$ to $11_N$ into a signal (a position information signal) for obtaining a relative position of each of the mobile stations $2_1$ to $2_5$ to the base transceiver station system 1 for the sake of a beam control for each group according to this embodiment and other signals (a traffic channel signal, a control channel signal used for a multiple access control and the like).

In response to an instruction from the base station controller 13 to be described later, the directivity control section 15 controls each of the antenna elements $11_1$ to $11_N$ so that at least one beam is radiated from the adaptive array antenna 11 with a desired direction and beam width. The directivity control section 15 transmits/receives each of signals to/from the transmission/receiving section 17, each of which is, by using the corresponding one of the beams, transmitted/received to/from the corresponding one of the mobile stations $2_1$ to $2_5$ for the corresponding one of the beams radiated from the adaptive array antenna 11.

The transmission/receiving processing section 17 receives, for each beam, the signals from the directivity control section 15, and separates these signals into each signal for a mobile station according to the multiple access manner adopted by the mobile communication system of this embodiment. Then, the transmission/receiving processing section 17 transmits the separated signals to the network interface section 18. The transmission/receiving processing section 17 receives signals to be transmitted to the mobile stations $2_1$ to $2_5$, from the network interface section 18, and duplexes these signals, for each beam used for communication with the mobile stations $2_1$ to $2_5$ to which these signals to be transmitted, according to the multiple access manner adopted by the mobile communication system of this embodiment. Thus, the transmission/receiving processing section 17 generates signals for each beam, and sends them to the directivity control section 15.

In the description of this embodiment, for simplicity of the explanation, the case is explained as an example in which the signals are transmitted and received between the base transceiver station system 11 and the mobile stations $2_1$ to $2_5$ by use of the same beam. However, the signals may be transmitted from the base transceiver station system 11 to the mobile stations $2_1$ to $2_5$ by use of a beam for transmission, and the signals may be received at the base transceiver station system 11 from the mobile station $2_1$ to $2_5$ by use of a beam for reception which, for example, have different frequency bands from the beam for transmission.

The position information extraction section 16 periodically calculates a relative position of each of the mobile stations $2_1$ to $2_5$ to the base transceiver station system 1 based on the position information signal sent from the duplexers $14_1$ to $14_N$ and notifies the relative positions to the base station controller 13. Note that various existing technologies can be employed as the method to obtain the relative position of each of the mobile stations $2_1$ to $2_5$ to the base transceiver station system 1. For example, a GPS (Global Positioning System) is adopted to each of the mobile stations $2_1$ to $2_5$, and each of the mobile stations $2_1$ to $2_5$ is allowed to transmit a signal as a position information signal, which includes the current position (an absolute position represented by a latitude and a longitude) obtained by the GPS, Thus, the position information extraction section 16 calculates the relative position of each of the mobile stations $2_1$ to $2_5$ to the base station 1 based on the current position of each of the mobile stations $2_1$ to $2_5$ and the setup position of the base transceiver station system 1. Alternatively, by cooperation of at least three base transceiver station systems 1, the relative position of each of the mobile stations $2_1$ to $2_5$ to the base transceiver station system 1 can be also calculated. Specifically, the position information extraction section 16 can calculate the relative position of each of the mobile stations to the base transceiver station system 1 based on a signal receiving level of at least three base transceiver station systems 1 and a difference of a signal receiving time among at least three base transceiver station systems 1.

Next, descriptions of the base station controller 13 will be made.

As shown in FIG. 2, the base station controller 13 comprises a classification section 19 and a directivity determination section 20.

The classification section 19 classifies the mobile stations $2_1$ to $2_5$ into groups, each of which includes the mobile stations positioned so as to be close to each other, based on the relative position of each of the mobile stations $2_1$ to $2_5$ received from the position information extraction section 16 of the base station apparatus 12, and makes a movement record of each group.

Figure 3:
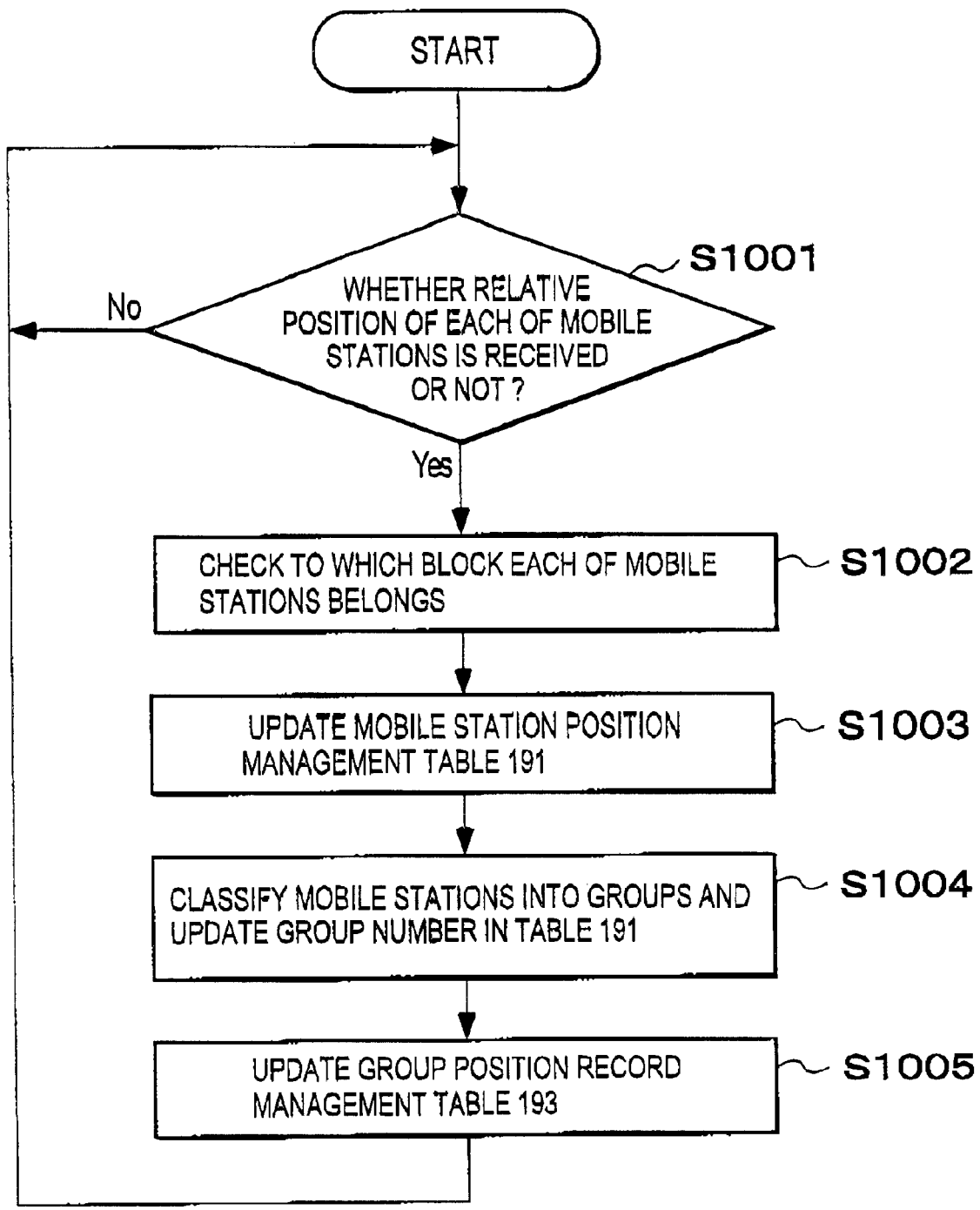
FIG. 3 is a flowchart showing processing procedures in a classification section 19 in the first embodiment of the present invention.

FIG. 3 is a flowchart showing processing procedures in the classification section 19.

When the classification section 19 receives the relative position of each of the mobile stations $2_1$ to $2_5$ from the position information extraction section 16 (step S1001), the classification section 19 checks, based on each of the relative positions, to which block in the service area covered by the base transceiver station system 1 each of the mobile stations belongs (step S1002).

Figure 4A:
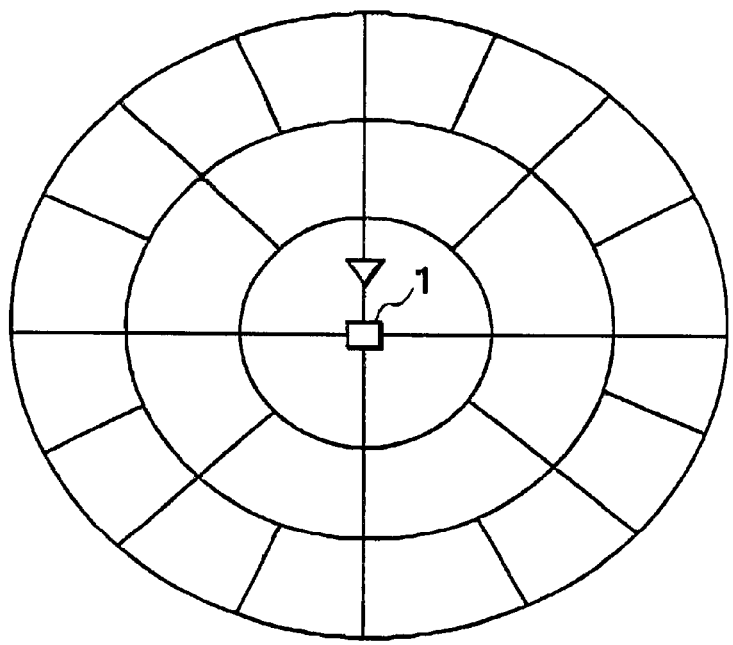
FIGS. 4A and 4B are views showing an example of each block of a service area covered by the base transceiver station system 1.
Figure 4B:
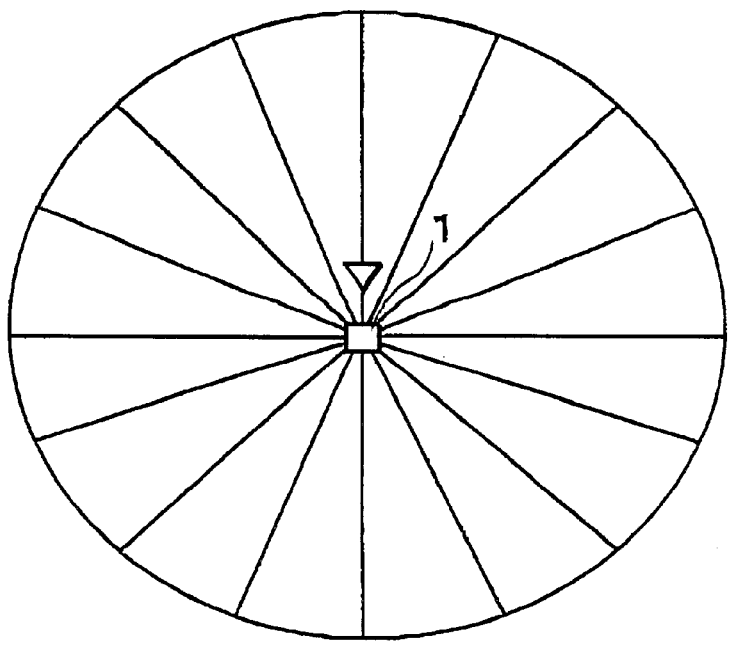

FIGS. 4A and 4B each show an example of each block of the service area covered by the base transceiver station system 1. As shown in FIGS. 4A and 4B, the service area covered by the base transceiver station system 1 is partitioned into the plurality of blocks, and each block is assigned a specific block number. The partition of the service area into each block is used for classifying the mobile stations $2_1$ to $2_5$ into the groups in a later described processing (step S1004). Any, method of partitioning the service area into the blocks will work. Moreover, blocks are not always necessary to have the same size. For example, in order to increase accuracy of grouping, blocks may be made to be small in a densely populated area, and blocks may be made to be large in a sparsely populated area. Furthermore, a size of the block may be changed depending on time in such a manner that an urban area is partitioned into small blocks and a suburb area is partitioned into large blocks in the daytime, and the urban area is partitioned into large blocks and the suburb area is partitioned into small blocks in the nighttime.

When the service area covered by the base transceiver station system 1 is partitioned into simply radial blocks with the base transceiver station system 1 as a center, as shown in FIG. 4B, the relative positions of the mobile stations $2_1$ to $2_5$ calculated by the position information extraction section 16 is satisfactorily represented by polar coordinates with the base transceiver station system 1 as the origin. With such way, only by checking an angle of each of the mobile stations $2_1$ to $2_5$, it is possible to obtain which block the mobile station is positioned in. In other words, a volume of calculation for calculating the blocks in which the mobile stations are positioned can be reduced.

When the block in which each of the mobile stations $2_1$ to $2_5$ is detected in the above described manner, the classification section 19 updates a mobile station position management table 191 installed therein in accordance with the detection result (step S1003).

FIG. 5 shows an example of the mobile station position management table 191. In FIG. 5, the mobile station number $191_1$ is a specific number for each of the mobile stations $2_1$ to $2_5$, and the block number $191_2$ is a specific number of a block, in which a mobile station having the mobile station number $191_1$ registered in corresponding entry is positioned. Furthermore, the group number $191_3$ is a specific number of a group to which a mobile station having the mobile station number $191_1$ registered in corresponding entry is already classified by a later described processing (step S1004), which has been performed prior to this process. Thus, when the mobile station having the mobile station number $191_1$ registered in corresponding entry is not yet classified into a group, the group number $191_3$ is blank.

Next, the classification section 19 classifies the mobile stations $2_1$ to $2_5$ into groups, each of which includes mobile stations positioned close to each other, using the mobile station position management table 191 updated in the step S1003, and updates the group number $191_3$ associated with each mobile station registered in the mobile station position management table 191 (step S1004). To be concrete, the processing is performed according to the following way.

Specifically, with respect to each group number $191_3$ registered in the mobile station position management table 191, detected is a block number $191_2$ of a block which includes the largest number of mobile stations classified into a group having the group number $191_3$ concerned, and the detected block number $191_2$ is associated with the group number $191_3$ concerned.

At this time, when block numbers $191_2$ detected for two or more group numbers $191_3$ are identical to each other, the detected block number $191_2$ is associated with a group number $191_3$ of a group which includes the largest number of mobile stations whose mobile station numbers $191_1$ are associated with the detected block number $191_2$. As a result, for another group number $191_3$ with which the detected block number $191_2$ is not associated, detected is another block number $191_2$ of a block which includes the second largest number of mobile stations classified into a group having the another group number $191_3$ concerned, and the another detected block number $191_2$ is associated with the another group number $191_3$ concerned. The above process is repeated until block numbers $191_2$ are associated with each of all the group numbers $191_3$ registered in the mobile station position management table 191.

As a result of the foregoing processing, if the block numbers $191_2$ have been associated with all of the group numbers $191_3$ registered in the mobile station position management table 191, it is checked whether a block number $191_2$ other than these block numbers $191_2$ associated with the group numbers $191_3$ is registered in the mobile station position management table 191. If the block number $191_2$ other than these block numbers $191_2$ is registered, a group number $191_3$ that is not registered in the mobile station position management table 191, that is, a group number $191_3$ that is not in use, is associated with this block number $191_2$. Note that judgements as to whether the group number $191_3$ is in use or not may be performed by using the group number usage state management table 192 as shown in FIG. 6.

By the above described processing, one group number $191_3$ is surely associated with each of the block numbers $191_2$ registered in the mobile station position management table 191. The classification section 19 classifies each of the mobile stations into a group having the group number $191_3$ which is associated with the block number $191_2$ of a block where the mobile stations concerned is positioned, and updates the group number $191_1$ of the group to be associated with the mobile station number $191_1$ registered in the mobile station position management table 191.

After the classification section 19 updates the group numbers $191_3$ registered in the mobile station position management table 191 as described above, the classification section 19 updates the group position record management table 193 installed therein (step S1005).

FIG. 7 shows an example of the group position record management table 193. Here, the group number $193_1$, is the group number $191_3$ registered in the mobile station position management table 191. The current block number $193_2$, is the current block number $191_2$ associated with the group number $193_1$ registered in the corresponding entry, that is, the block number $191_2$ registered, in the mobile station position management table 191 updated as a result of the processing in the recent step S1003, in this routine, so as to be associated with the group number $191_3$ corresponding to the foregoing group number $193_1$. On the other hand, the last block number $193_3$, is the last block number $191_2$ associated with the group number $193_1$ registered in the corresponding entry, that is, the last block number $191_2$, registered, in the mobile station position management table 191 before being updated by the processing in step S1003 in this routine, so as to be associated with the group number. Note that when such block number does not exist, that is, when the group number $193_1$ is one that is given for the first time by the processing in the step S1003 in this routine, the last block number $193_3$ remains blank.

The description will be continued returning to FIG. 2.

The directivity determination section 20 determines the direction and beam width (radiation angle) of each beam which is radiated from the adaptive array antenna 11 to the corresponding one of the groups classified by the classification section 19. Then, the directivity determination section 20 notifies the direction and beam width thereof to the directivity control section 15 of the base station apparatus 12.

Figure 8:
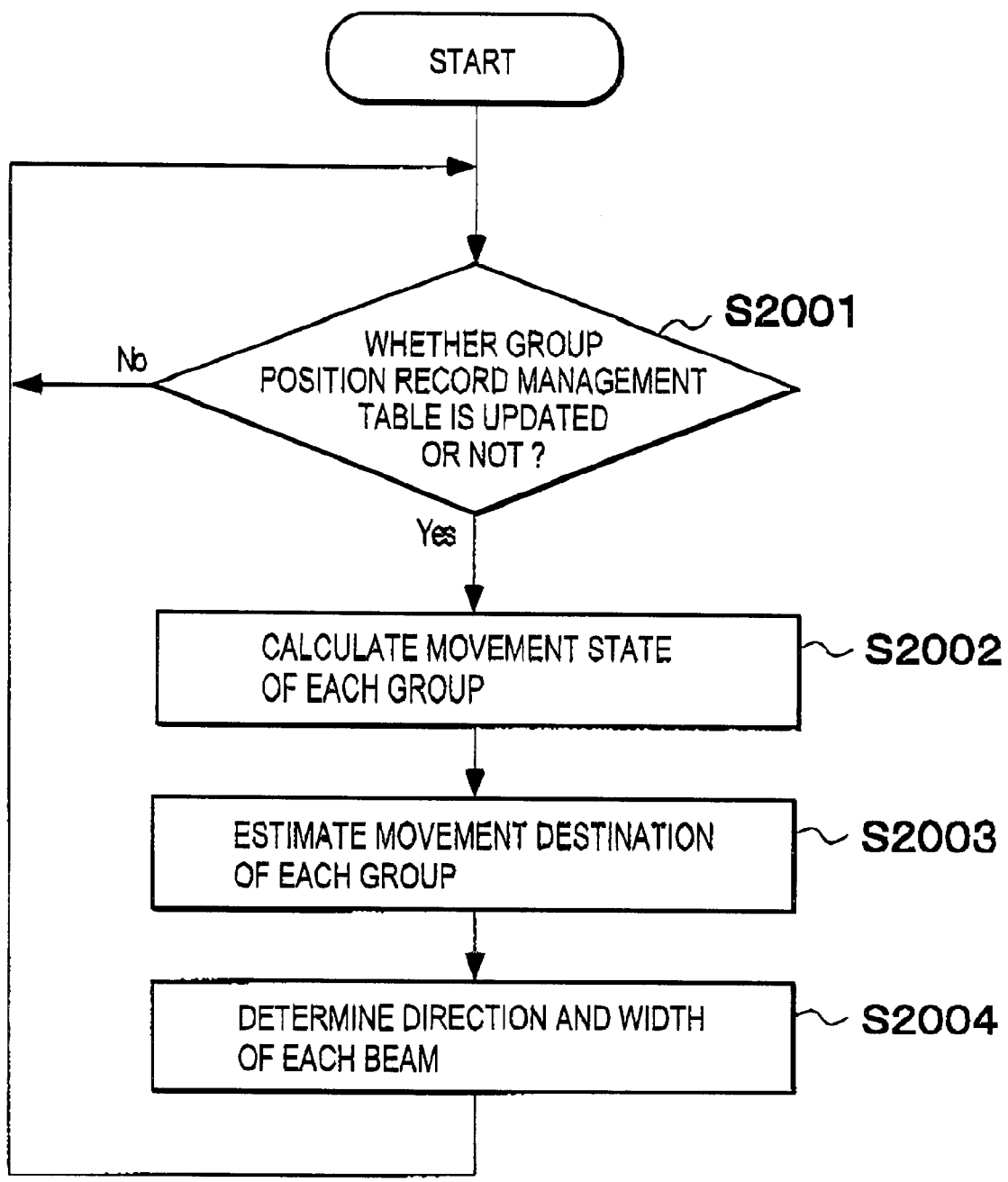
FIG. 8 is a flowchart showing processing procedures in a directivity determination section 20 in the first embodiment of the present invention.

FIG. 8 shows processing procedures in the directivity determination section 20.

When the group position record management table 193 is updated by the classification section 19 (step S2001), the directivity determination section 20 calculates the movement states (movement speed, acceleration and movement direction) of each group registered in the group position record management table 193 (step S2002). To be concrete, the calculation is performed according to the following way, Taking notice of any group number $193_1$ registered in the group position record management table 193, the directivity determination section 20 calculates the movement speed and acceleration of the group having this group number $193_1$, based on a distance between a location of the block specified by the current block number $193_2$ and a location of the block specified by the last block number $193_3$, an update interval of the group position record management table 193, and the movement speed of this group calculated last time. The update interval agrees with an interval of relative position calculation of each of the mobile stations $2_1$ to $2_5$ by the position information extraction section 16. At this time, the directivity determination section 20 also obtains the movement direction of this group based on the location of the block specified by the current block number $193_2$ and the location of the block specified by the last block number $193_3$.

When the movement speed of this group is not calculated last time, the directivity determination section 20 treats the acceleration of this group as if the acceleration of this group cannot be calculated. The directivity determination section 20 calculates only the movement speed based on the distance between the location of the block specified by the current block number $193_2$ and the location of the block specified by the last block number $193_3$, and the update interval of the group position record management table 193. At this time, the directivity determination section 20 also obtains the movement direction of this group based on the location of the block specified by the current block number $193_2$ and the location of the block specified by the last block number $193_3$.

When the movement speed of this group is not calculated last time and when the last block number $193_3$ in the group position record management table 193 is blank, the directivity determination section 20 treats the movement speed, acceleration and movement direction of this group as if they cannot be calculated.

Figures 9, 10:
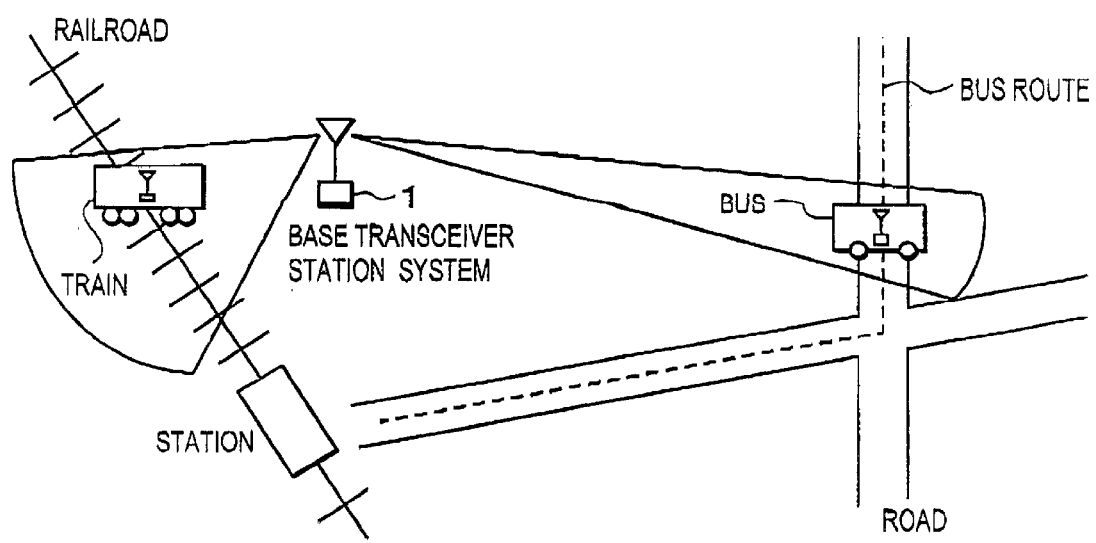
FIG. 9 is a view showing an example of a group movement state management table 201 used in the first embodiment of the present invention.
FIG. 10 is a view for explaining an environment in the vicinity of the base transceiver station system 1.

The directivity determination section 20 performs the foregoing processing for the groups of all group numbers $193_1$ registered in the group position record management table 193, and, according to results of the processing, updates a group movement state management table 201 as shown in FIG. 9. Note that, in FIG. 9, the blank represents no calculation.

Then, the directivity determination section 20 estimates movement destinations after a predetermined period of time (for example, the update interval of the group position record management table 193) for the groups of all group numbers $193_1$ registered in the group movement state management table 201 (step S2003). To be concrete, the estimation of the movement destination is performed according to the following way.

Specifically, taking notice of any group number $193_1$ registered in the group movement state management table 201, the directivity determination section 20 estimates the movement destination of the group having this group number $193_1$ after the predetermined period of time, based on the movement speed, acceleration and movement direction of this group. Note that when the acceleration is not registered in the group movement state management table 201, the directivity determination section 20 estimates the movement destination of this group after the predetermined period of time, based on the movement speed and movement direction of this group. Furthermore, when any of the movement speed, the acceleration and the movement direction is not registered in the group movement state management table 201, the directivity determination section 20 treats the movement destination as if it cannot be estimated. The directivity determination section 20 performs the foregoing processing for the groups of all group numbers $193_1$ registered in the group movement state management table 201.

Next, the directivity determination section 20 determines the direction and width of each of the beams to cover all of the mobile stations belonging to the group, for each group number $193_1$ registered in the group position record management table 193 (step S2004). To be concrete, the directivity determination section 20 determines the direction and width of each of the beams according to the following way.

Specifically, taking notice of any group number $193_1$ registered in the group position record management table 193, the directivity determination section 20 determines the direction and width of the beam for the group having this group number 193, so that the beam can cover a range including the location of the block specified by the current block number $193_2$ and the movement destination estimated for this group in the processing of the step S2003. When the movement destination is not estimated in the processing of the step S2003, the directivity determination section 20 determines the direction and width of the beam for this group so that the beam can cover a range defined in consideration of a predetermined margin including the location of the block specified by the current block number $193_2$.

When the directivity determination section 20 completes to perform the foregoing processing for the groups of all group numbers $193_1$ registered in the group position record management table 193, the directivity determination section 20 notifies the direction and width of the beam determined for each group to the directivity control section 15 of the base station apparatus 1. Upon receipt, the directivity control section 15 controls each of the antenna elements $11_1$ to $11_N$ so that the plurality of beams are radiated from the adaptive array antenna 11 with the directions and widths determined for each group.

The first embodiment of the present invention has been described in the above.

As show in FIG. 10, it has been known from experience that a plurality of mobile stations existing on a railroad and a bus route moves in the same action pattern. Furthermore, streams of people are often regular along the streets. Therefore, an extremely valid estimation is established that mobile stations positioned close to each other would continue to move in similar action patterns. This embodiment is based on this estimation. In this embodiment, the plurality of mobile stations are classified into groups in each of which the mobile stations positioned close to each other, and an area of a movement destination is estimated for each group. A beam is controlled for each group. With such manner, while effectively controlling interference of the plural beams radiated from the adaptive array antenna 11, it is possible to capture each of the mobile stations $2_1$ to $2_5$ by the beam, which are positioned in the service area covered by the base transceiver station system 1.

Next, a second embodiment of the present invention will be described.

In the foregoing first embodiment, the estimation of the movement destination of each group was performed based on the transition of the block associated with each of the groups. In contrast, according to this embodiment, the estimation of the movement destination of each group is performed based on the transition of the position of each group.

A configuration of the base station apparatus used in this embodiment is the same as that of the first embodiment shown in FIG. 2. Note that processing in the classification section 19 and the directivity determination section 20 of the base station controller 13 differs.

The processing in the classification section 19 will be described first.

The processing procedures of the classification section 19 of this embodiment are the same as those of the first embodiment shown in FIG. 3. In this embodiment, as shown in FIG. 11, the coordinate values $191_4$, each of which a relative position of a mobile station having the mobile station number $191_1$ is registered, are added to the mobile station position management table 191 which is updated in the step S1003. As the group position record management table 193 which is updated in the step S1005, the one shown in FIG. 12 is used instead of the one shown in FIG. 7.

In the group position record management table 193 shown in FIG. 12, the current group position $193_4$ is a current location (the location newly calculated in this routine) of a group having the group number $193_1$ registered in the corresponding entry, and the last group position $193_5$ is a last location (the location calculated last routine) of this group. Furthermore, the group scale $193_6$ is a scale of the group having the group number $193_1$ registered in the corresponding entry. Here, as the location of the group, either an average value or the center of gravity of coordinate values $191_4$, registered in the mobile station position management table 191, of the mobile stations which are classified into this group can be used. As the scale of the group a value expressing, relative to the current location $193_4$ of this group, variations of coordinate values $191_4$, registered in the mobile station position management table 191, of the mobile stations which are classified into this group can be used, and a value expressed by a function using the maximum distance among the mobile stations which are classified into this group as an argument can be used.

Next, a processing in the directivity determination section 20 will be described.

Processing procedures in the directivity determination section 20 of this embodiment are the same as those of the first embodiment shown in FIG. 8. Note that the calculation of the movement state of each group in the step S2002 is performed according to the following way.

Taking notice of any group number $193_1$ registered in the group position record management table 193 shown in FIG. 12, the directivity determination section 20 calculates the movement speed and acceleration of the group having this group number $193_1$ based on a distance between the current group position $193_4$ and the last group position $193_5$, the update interval of the group position record management table 193 and the movement speed of this group calculated in last interval. At this time, the directivity determination section 20 also obtains the movement direction of this group based on the current group position $193_4$ and the last group position $193_5$.

When the movement speed of this group is not calculated in last routine, the directivity determination section 20 treats the acceleration of this group as if the acceleration of this group cannot be calculated, and calculates only the movement speed of this group based on a distance between the current group position $193_4$ and the last group position $193_5$ and the update interval of the group position record management table 193. At this time, the directivity determination section 20 also obtains the movement direction of this group based on the current group position $193_4$ and the last group position $193_5$.

When the movement speed of this group is not calculated in last routine and when the last group position $193_5$ in the group position record management table 193 is blank, the directivity determination section 20 treats the movement speed, acceleration and movement direction of this group as if they cannot be calculated.

Determinations of the direction and width of each beam in the step S2004 are performed in the following way.

Figure 13:
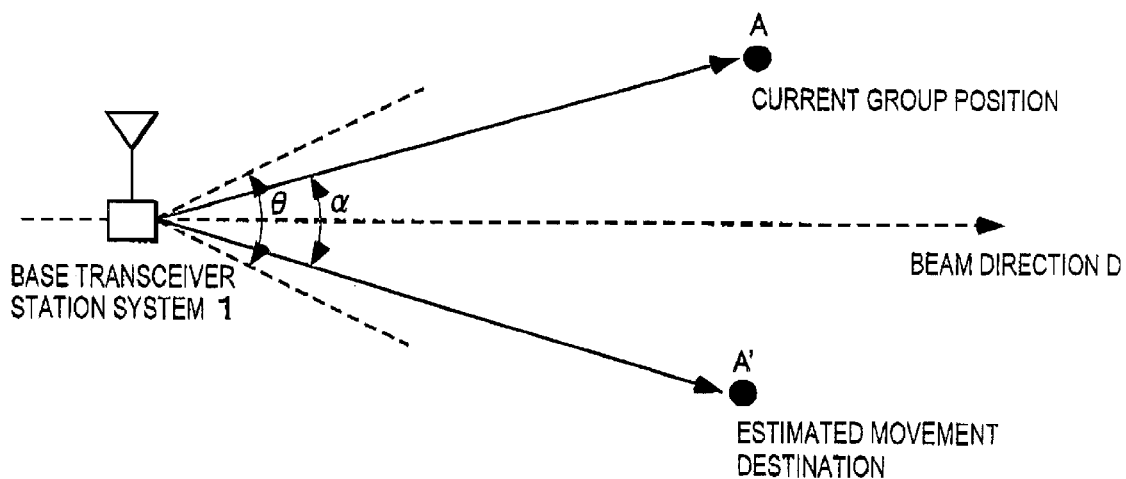
FIG. 13 is a view for explaining a direction and width of a beam which is controlled to be radiated in the second embodiment of the present invention.

To be specific, taking notice of any group number $193_1$ registered in the group position record management table 193 shown in FIG. 12, the directivity determination section 20 determines the direction and width of the beam for the group having this group number $193_1$ so that the beam can cover a certain range. The certain range is the one obtained by adding a margin to a range including the current group position $193_4$ and the movement destination estimated for this group in the processing of the step S2003. The margin is set so as to be larger as the group scale $193_6$ in the group position record management table 193 becomes larger. For example, as shown in FIG. 13, when the current position $193_4$ of a certain group is A and the estimated movement destination of the certain group is A', the direction and width of the beam for this group is determined so that the beam can cover the range θ obtained by adding a margin in accordance with a scale of this group to an angle α between the line passing through the present group position A and the base transceiver station system 1 and the line passing through the estimated movement destination A' and the base transceiver station system 1. To be more specific, the beam direction is the direction D that divides the angle into two equally, the angle between the direction obtained by looking at the point A from the base transceiver station system 1 and the direction obtained by looking at the point A' from the base transceiver station system 1, and the beam width may be the value θ obtained by multiplying the angle α between the points A–A' by the margin in accordance with the group scale.

Figure 14:
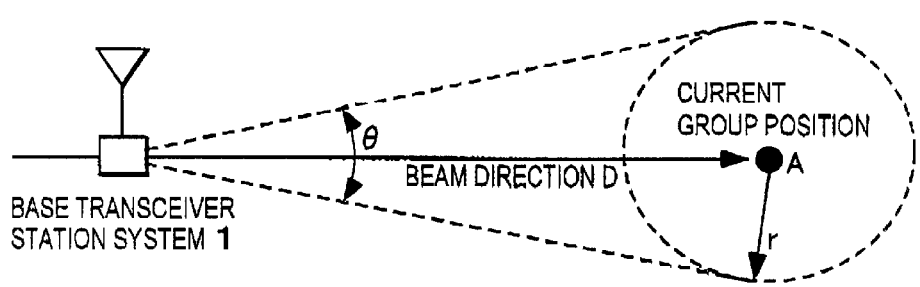
FIG. 14 is a view for explaining a direction and width of the beam which is controlled to be radiated in the second embodiment of the present invention.

For a group whose movement destination is not in the processing of the step S2003, the directivity determination section 20 determines the direction and width of the beam so that the beam can cover a range specified by a radius value which is set to be larger as the group scale $193_6$ becomes larger. One end of the radius is disposed at the current group position $193_4$ of this group as the center of a circle. For example, as shown in FIG. 14, when a group position of a certain group is A and its movement destination is not estimated, the directivity determination section 20 determines the direction and width of the beam for this group so that the beam can cover a range specified by a radius value, having the point A as the center of a circle, in accordance with a group scale $193_6$ of this group.

The second embodiment of the present invention has been described as above.

According to this embodiment, since the direction and width of the beam are determined for each group in consideration of its scale, it is possible to capture with high precision each of the mobile stations 21 to 26 positioned in the service area covered by the base transceiver station system 1.

The embodiments of the present invention has been described as above.

According to the embodiments of the present invention, with such foregoing configuration, since a beam is never radiated to an area where mobile stations do not exist, radio resources are not consumed for a beam which is not actually in use for a communication with the mobile stations. Furthermore, since the direction and width of each beam radiated from the adaptive array antenna 11 are controlled so that the beam can cover the block in which the group to be captured is positioned and its movement destination, it is possible to effectively capture each mobile station positioned in the service area covered by the base transceiver station system 1. As described above, according to the embodiments of the present invention, the adaptive array antenna 11 can be controlled so that each mobile station positioned in the service area covered by the base transceiver station system 1 can be captured by the beam, while achieving the effective utilization of the radio resources.

According to the embodiments of the present invention, since the beam is controlled for each group, it is possible to decrease a required processing capability compared to a case where the beam is controlled for each mobile station.

Note that the present invention is not limited to the foregoing embodiments, but various modifications can be made without departing from scope of the present invention.

For example, in the foregoing embodiments, the movement speed, acceleration and movement direction (step S2002 of FIG. 8) of each group calculated by the directivity determination section 20 may be a movement angular velocity, an angular acceleration and a rotation direction (clockwise or counterclockwise) when each group is looked at from the base transceiver station system 1 as the origin, and the movement destination (step S2003 of FIG. 8) of each group estimated by the directivity determination section 20 may be a direction obtained by looking at the estimated movement destination of each group from the base transceiver station system 1 as the origin. In this case, if the relative position of each of the mobile stations $2_1$ to $2_5$ calculated by the position information extraction section 16 is represented by polar coordinates, these can be effectively calculated.

Furthermore, in the foregoing embodiments, the current block number $193_2$ or the current group position $193_4$, and the last block number $193_3$ or the last group position $193_5$ for each group are registered in the group position record management table 193 (FIG. 7 and FIG. 12). A block number prior to the last block number $193_3$ or a group position prior to the last group position $193_5$ may be registered therein. In the directivity determination section 20, a movement track of each group is specified by use of these records, and a movement direction may be determined based on the specified track.

Furthermore, in the foregoing embodiments, the base station apparatus 1 and the base station controller 13 may be constructed on one apparatus integrally. Alternatively, they may be constructed on a plurality of apparatuses separately.

In the foregoing embodiments, the record of each group is registered in the group position record management table 193, and, by use thereof, the direction and width of each beam are determined so that the estimated movement destination of each group is also covered. However, the present invention is not limited to this. For example, a service area covered by the base transceiver station system 1 is partitioned to plural blocks in consideration of environments around a setup place of the base transceiver station system 1, and the direction and width of each beam may be controlled without estimating the movement destination of each group so that each beam covers only the block in which each group is positioned.

In this case, for example, the movement records of each mobile station existing around the setup place of the base transceiver station system 1 are previously added up, and by referring to an action pattern, which is estimated based on the addition result, of each mobile station existing around the setup place of the base transceiver station system 1, a large block is assigned to an area in which a group of mobile stations positioned close to each other moves at a high angular velocity (an angular velocity with respect to the base transceiver station system 1 as the origin), and a small block is assigned to an area in which a group of mobile stations positioned close to each other moves at a low angular velocity. In spite of an equal linear velocity, an angular velocity of a mobile station moving along a circumference direction around the base transceiver station system 1 is faster as the mobile station is closer to the base transceiver station system 1. In other words, a mobile station positioned in the vicinity of the base transceiver station system 1 generally moves at a higher angular speed compared to a mobile station positioned far away from the base transceiver station system 1. Accordingly, as shown in FIG. 4A, a large block may be assigned to an area close to the base transceiver station system 1, and a small block may be assigned to an area far away from the base transceiver station system 1. With such manner, similarly to the foregoing embodiments, while effectively controlling interference of the plurality of beams radiated from the adaptive array antenna, it is possible to capture each of the mobile stations by the beam, which are positioned in the service area covered by the base transceiver station system.

Although the case in which the adaptive array antenna is used is taken for describing the foregoing embodiments, any antenna will do as long as the antenna is a directional antenna capable of changing a direction and width (radiation angle) of each beam to perform radio communications with a plurality of mobile stations.

In the foregoing embodiments, when the mobile stations are classified into groups by use of, for example, the blocks as shown in FIG. 4A, areas covered by beams radiated to each of the plurality of groups may overlap partially or wholly, depending on positional relationships of blocks. In such case, the directivity control section 15 may be corrected so that, for example, a frequency band of each beam differs. Alternatively, when mobile stations exist in the plurality of blocks in the same direction viewed from the base transceiver station system 1, the classification section 19 may be corrected so as to classify the mobile stations existing in these blocks into one group.

Furthermore, in the foregoing embodiments, the mobile stations move from a certain group to other groups in some cases. In these cases, using the existing hand over technology, switching may be made from a communication using a beam for the certain group to a communication using a beam for other groups, for example, on the mobile station side. A processing in case where a beam is changed (a mobile station moves to a different area so as to be captured by a different beam) is reported in Hiroyuki Tsuji, "Key Technology for Mobile Communication—Adaptive Array Antenna (Former and Later Parts)", *Interface Magazine*, (February 1999): 176–181, (March 1999): 168–173, CQ publications.

As described above, according to the present invention, further effective utilization of radio resources can be achieved.

What is claimed is:

1. A method of controlling a directional antenna for use in a radio communication with a plurality of mobile stations, which is capable of changing a direction and width (radiation angle) of each of a plurality of beams to radiate the beams, comprising the steps of:

a first step for obtaining information on a position of each of said plurality of mobile stations;

a second step for classifying said plurality of mobile stations into groups each of which is a group of closely positioned mobile stations, based on the information on the position of each of said plurality of mobile stations, which is obtained in said first step, concerning;

a third step for managing a position record of each group classified by said second step and for estimating an area to which said each group moves, based on said position record of each group; and a fourth step for controlling the direction and width of each of the beams radiated by said directional antenna on a group-by-group basis so that one beam radiated by said directional antenna can cover an area in which one group classified by said second step is positioned and an area to which said one group concerned moves, which is estimated by said third step.

2. A control apparatus of a directional antenna for use in a radio communication with a plurality of mobile stations, which is capable of radiating a plurality of beams, the beams having a direction and width (radiation angle) respectively different from each other, comprising:

obtaining means for obtaining information on a position of each of said plurality of mobile stations;

classifying means for classifying said plurality of mobile stations into groups each of which is a group of closely positioned mobile stations, based on the information on the position of each of said plurality of mobile stations, which is obtained by said obtaining means;

estimating means for managing a position record of each group classified by said classifying means and for estimating an area to which said each group moves, based on said position record of each group; and controlling means for controlling the direction and width of the beams radiated by said directional antenna on a group-by-group basis so that one beam radiated by said directional antenna can cover an area in which one group classified by said classifying means is positioned and an area to which said one group concerned moves, which is estimated by said estimating means.

3. The control apparatus according to claim 2, wherein, as a group is closer to a setup position of said directional antenna, said controlling means controls the width of the beam radiated to the group by said directional antenna so that the beam can cover a broader area so as to include the area where the group is positioned.

4. The control apparatus according to claim 2, wherein said directional antenna is an adaptive array antenna composed of a plurality of antenna elements.

5. The control apparatus as claimed in claim 2 further comprising a directional antenna for use in a radio communication with a plurality of mobile stations, which is capable of changing a direction and width (radiation angle) of a plurality of beams respectively and capable of radiating the plurality of beams.

6. The control apparatus according to claim 5, wherein said directional antenna is an adaptive array antenna composed of a plurality of antenna elements.

* * * * *